Figure 1:
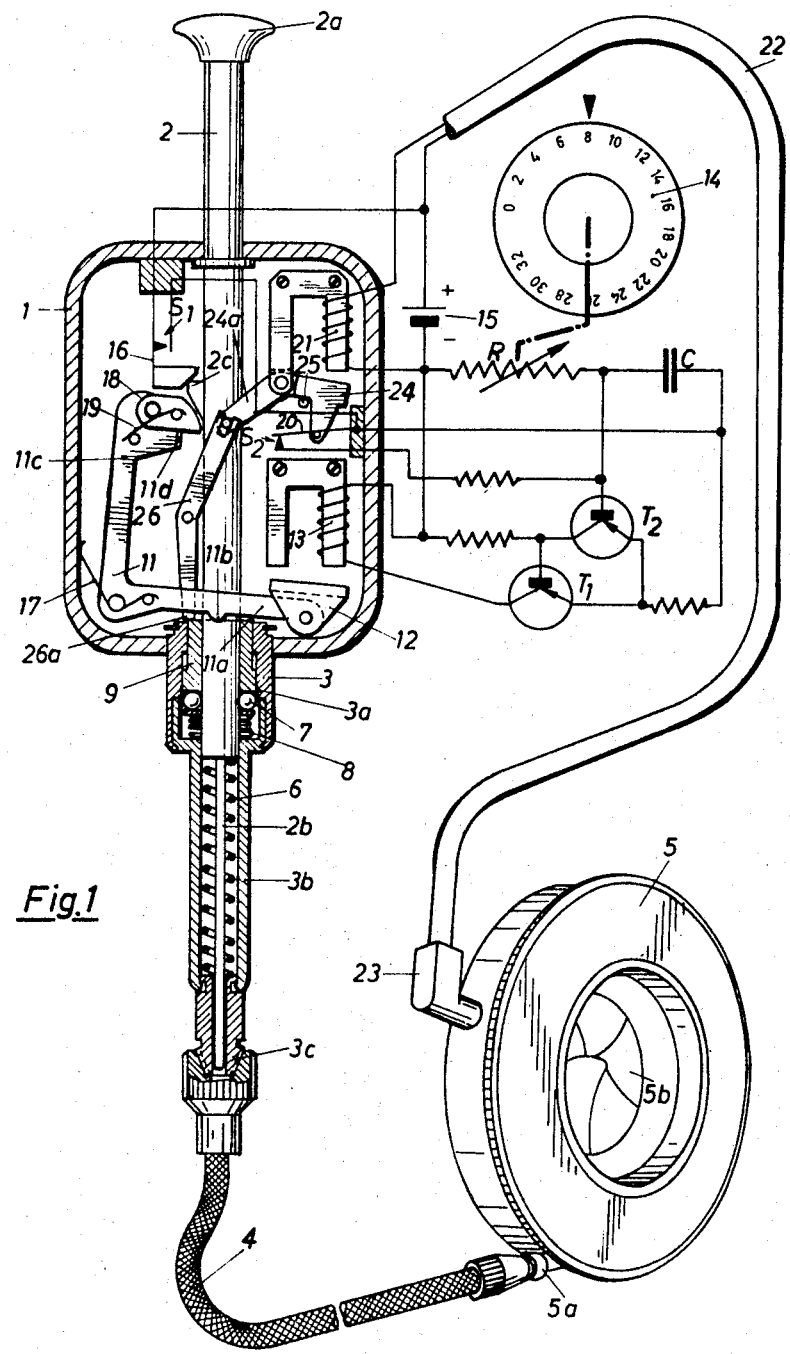

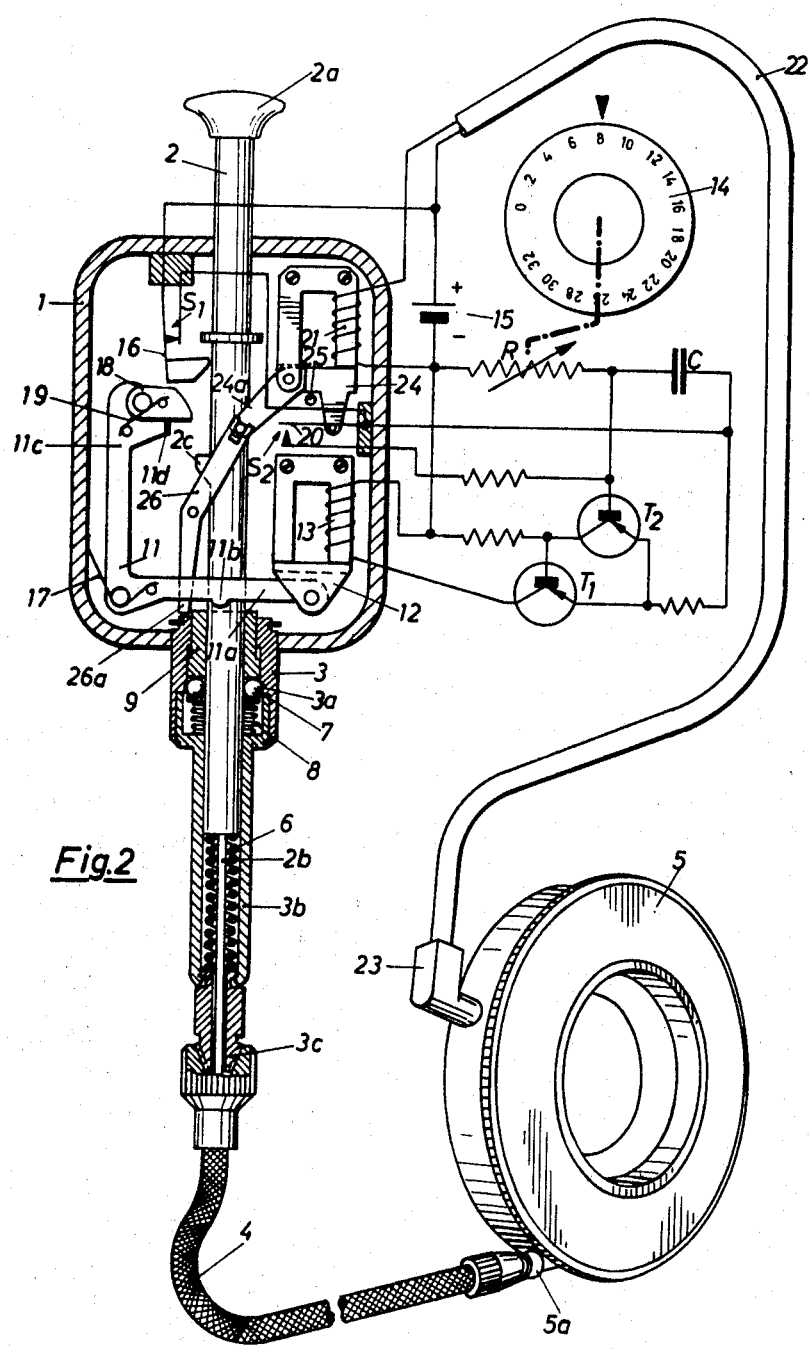

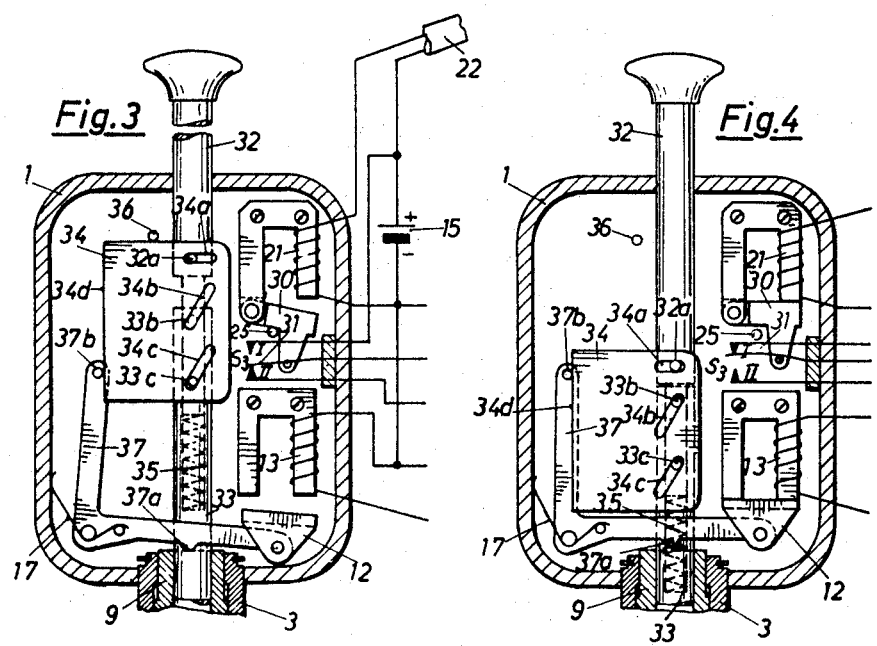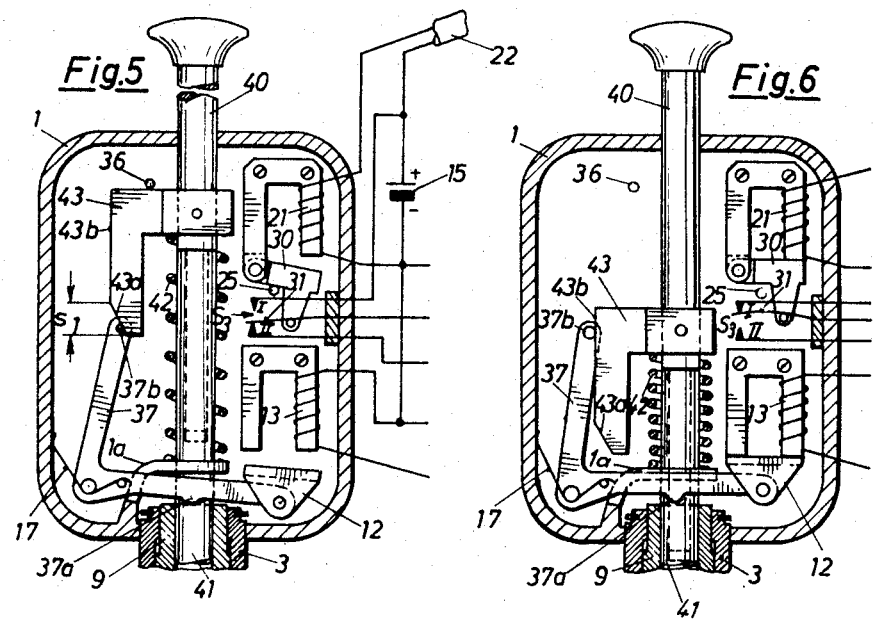

Dec. 31, 1968    W. T. RENTSCHLER ET AL    3,418,910
RELEASE DEVICE FOR A PHOTOGRAPHIC CAMERA
Filed Sept. 19, 1966    Sheet 4 of 4
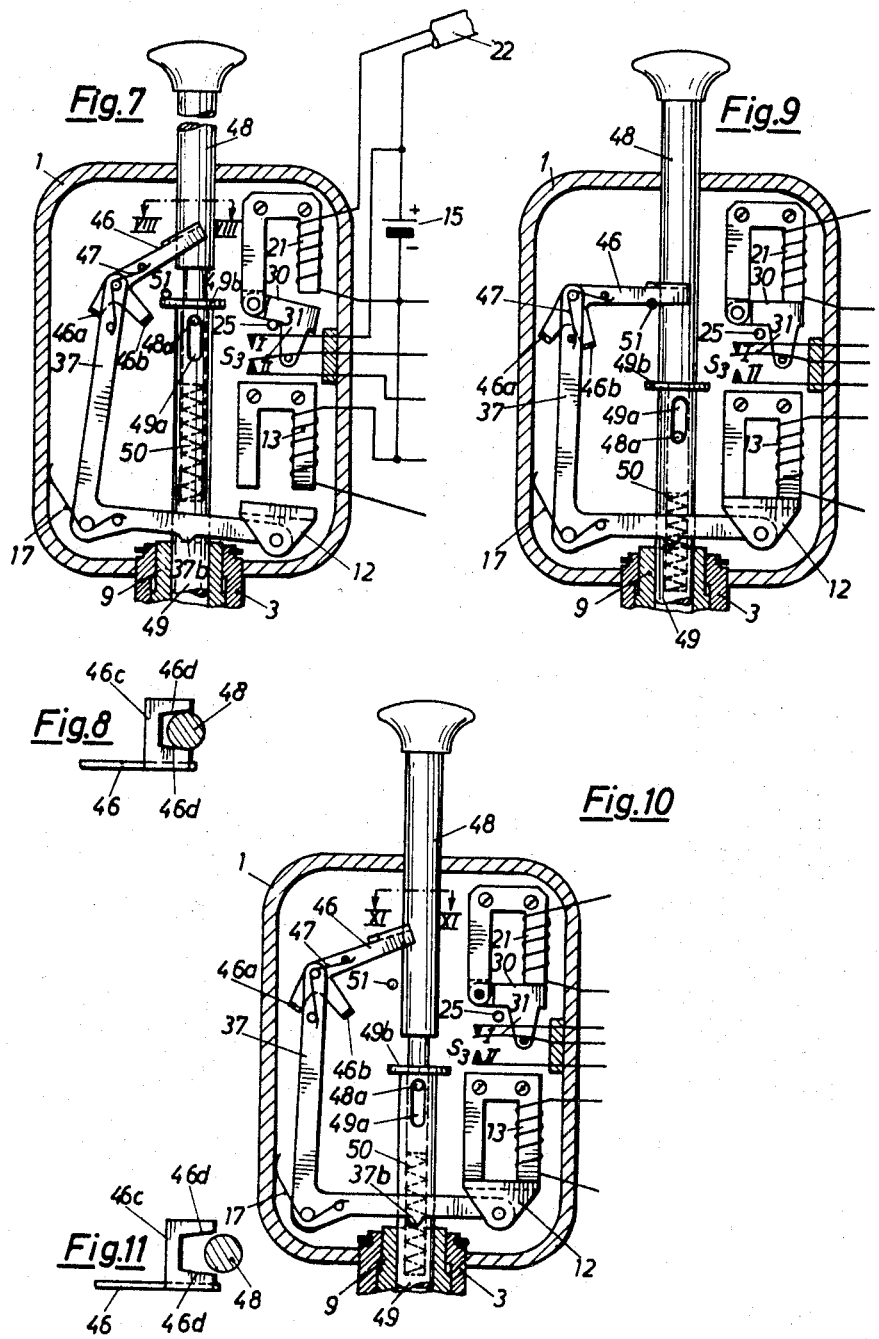
INVENTORS
WALDEMAR T. RENTSCHLER
et al
BY Arthur A. March
ATTORNEY

United States Patent Office 3,418,910
Patented Dec. 31, 1968

3,418,910
RELEASE DEVICE FOR A PHOTOGRAPHIC
CAMERA
Waldemar T. Rentschler and Franz W. R. Starp,
Calmbach, Black Forest, and Heinz Karl Mutterer,
Sprollenhaus, Germany, assignors to Prontor-Werk
Alfred Gauthier G.m.b.H., Calmbach, Black
Forest, Germany, a corporation of Germany
Filed Sept. 19, 1966, Ser. No. 580,457
Claims priority, application Germany, Sept. 21, 1965,
P 37,702
13 Claims. (Cl. 95—53.3)

This invention relates to a device for releasing a photographic camera, and more particularly, to a release device having a plunger which acts upon the shutter of a photographic camera and which is equipped with an adjustable device to achieve relatively long exposure times of varying duration when the camera is set to "B."

It has previously been proposed in connection with such a release mechanism to design the timing device as an electronic trip circuit. In such an arrangement, a means including a resistor and a capacitor known as an RC member, is used as the time regulating member to which voltage is applied by a special switch when the release plunger is actuated. Prior to releasing the camera shutter, the device is set so that the actuation of this switch coincides as closely as possible in time with the release of the shutter, which can be determined by a special control device disposed in the release device.

It is an object of this invention to provide a release device of the type previously referred to in which the progression of the various functional steps is assured to be effected in the proper time sequence, with relatively few structural parts that are easily handled.

To accomplish this, the invention provides an electronic timing device which includes resistor-capacitor means, that is an RC member, which is equipped with a contact switch for initiating the charging of a capacitor, said switch cooperates with a relay which can be attached to the flash contact nipple of a camera by means of a connecting cable to which current from the battery can be applied through the flash contact when the shutter blades have reached the open position. This allows the provision for a release device in which the wear on the movable parts is reduced to a minimum because of the use of an electronic timing device. The actuation of the contact switch cooperating with the RC member occurs automatically and always at the proper instant through a pulse released by the shutter. This eliminates the necessity of making precise adjustments of the release device, thereby providing simplified handling. Further, there is assurance that the exposure time, preset at the release device, is actually maintained so that the exposure results will always correspond to the setting at the device.

A circuit arrangement for the relay, particularly advantageous from a structural viewpoint, can be achieved according to an addition embodiment of the invention by connecting the relay, in parallel to the electronic timing device, to its power source and by arranging the flash contact of the camera to which the device is attached in series with the relay and battery.

Further, the invention provides for the contact switch cooperating with the RC member to have a contact spring which, against the bias of the spring, is movable by the armature of the relay from the contact position for the capacitor into the interrupted position in which the capacitor begins charging. This embodiment permits a space saving configuration, which is possible by the use of simple means, because no special transmitting means are required to actuate the switch.

Functionally, reliable operation is achieved with relatively simple means in that a safety device cooperates with the relay operable by the flash contact. The safety device acts upon a detent holding the release plunger of the device in the release position and prevents the detent from assuming the locked position prior to the release of the shutter. This provision always allows the release plunger to return to its starting position when it is inadvertently actuated and after the load has been removed from it. For example, this can be accomplished according to the invention by making the relay cooperate with a pivotally mounted, two arm support lever which prevents the detent from assuming its locked position when the relay is currentless.

A solution, particularly favorable from a structural as well as a functional viewpoint for achieving reliable operation, according to another embodiment of this invention, is supplied by providing, in addition to the contact switch for the RC member, a main switch of the electronic timing device that cooperates directly with the relay. Such a main switch with the shutter released is movable into the contact making position by the relay. There is also provided a release plunger which is formed by two coaxially disposed parts, movable with respect to each other, the upper part of which cooperates with the angular lever keeping the detent in its ineffective position in such a way that the angular lever is moved out of its starting position when the plunger is actuated, thereby releasing the detent, and moved into contact with the holding magnet controlled by the electronic switching device.

In an additional embodiment of this invention, plunger parts, which are biased apart can be joined to each other by a slide plate, movable transversely to the actuating direction, which has a guide edge against which the angular lever rests under the effect of a return spring. The pivotal motion of the angular lever can also be achieved according to the invention by an actuating arm, fastened to the upper part of the plunger, that is equipped with a steering edge for pivoting the angular lever.

A design solution for the actuation of the angular lever in a particularly favorable manner, which takes into consideration the spatial conditions in the release device, consists, according to another embodiment of this invention, in providing the arm of the angular lever, which cooperates with the upper part of the plunger, with a pivotally mounted by pass pawl having a jaw clutch which can be brought into frictional contact with the upper part of the plunger. This pawl desirably has two stops for limiting the relative rotational motion of the pawl with respect to the angular lever. The pawl is so arranged that when in the starting position as fixed by one of the stops, it adheres by the frictional contact of the conical sides of the jaw clutch to the outer surface of the upper part of the plunger. The second stop limits the relative pivotal motion of the pawl with respect to the angular lever upon actuation of the plunger. To further increase the functional reliability of the device, another embodiment provides two plunger parts that are connected to each other by a pin and slot arrangement and loaded by a compression spring acting upon both parts. A stop collar is provided on the lower part of the plunger which rests against a stationary pin in the starting position of the plunger under the influence of the return spring.

Various other objects, features and advantages of this invention will be apparent from the following specification, claims and the drawings appended hereto wherein:

FIGURE 1 shows a partially diagrammatic longitudinal sectional view of an electronically controlled release device with a relay to actuate the contact switch assigned to the RC member of the electronic timing device and to influence the detent acting upon the release plunger. The device is connected to both the wire release connection and the flash contact connector of the shutter of a camera not shown in detail, and the release device and shutter here are illustrated in their starting position, FIGURE 2 is a view similar to FIGURE 1 with the device in the release position and the shutter connected thereto in open position, FIGURE 3 is a variation of the device of FIGURE 1, in which besides the contact switch for the RC member, the main switch of the electronic switching device can be actuated by the relay, and wherein the release plunger consists of two parts joined to each other by a slide plate movable crosswise, FIGURE 4 is similar to FIGURE 3 and illustrates the parts in the release position, wherein the upper part of the plunger is still depressed, FIGURE 5 is another embodiment of the invention, also having a two-part release plunger in the starting position, wherein an actuating arm fastened to the upper part of the plunger is provided for pivoting the angular lever, FIGURE 6 is similar to FIGURE 5 illustrating the release plunger in the depressed position.

FIGURE 7 shows another embodiment for pivoting the angular lever, by means of a by pass pawl disposed thereon which is in frictional contact with the upper part of the plunger, FIGURE 8, a section along line VIII—VIII in FIGURE 7, FIGURE 9 shows the embodiment of FIGURE 7 with release plunger partially depressed, wherein the relative rotary motion of the by pass pawl is limited by a stop, FIGURE 10 shows the device in the release position, in which the lower part of the plunger is arrested by the detent, and wherein the upper part of the plunger is under no load, FIGURE 11, a section along line XI—XI in FIGURE 10.

Referring now to the drawings, there is illustrated in FIGURES 1 and 2 the release device of this invention which is attachable to cameras with release connections, so that exposure times of relatively long duration can be achieved. The release device has a housing 1 with a release plunger 2 movably mounted therein having a push button 2a disposed on one end of a push pin 2b. The release plunger 2 is guided for slidable movement in the housing 1 by a fixed bushing 3 which has a conical inner surface 3a, and a release tube 3b extending therefrom and terminating in a threaded socket 3c. A flexible cable release adapter 4 threaded on the socket 3c is provided to attach the release device to a flexible cable release connection 5a of a photographic camera (not shown) disposed, for example on its shutter housing 5. The shutter housing 5 has several shutter sectors 5b and is also equipped to take flash bulb pictures, by the provision of a conventional flash contact (not shown) in the shutter housing 5, and flash contact connector socket (not shown) mounted for engagement with a cable plug 23. The flash contact connector socket and the flexible cable release connection 5a can also be disposed at appropriate locations on the camera housing.

While the release plunger 2 is held in its starting position, as illustrated in FIGURE 1, by a return spring 6, it is held in the release position, as illustrated in FIGURE 2, by a ball detent such as the type having the balls 7 biased by the force of a compression spring 8 into contact with an unlocking sleeve 9 movably guided in the bushing 3. The arrangement of this detent is such that, while the balls 7 allow the release plunger 2 to be depressed, they prevent its return to its initial position, because the balls 7 with the unlocking sleeve 9 being freely movable upwardly are wedged into a fixed position by the conical inner surface 3a until the wedging effect is cancelled out by a pressure on the unlocking sleeve 9 counteracting the compression spring 8.

As may be seen from the drawings, in order to unlock the ball detent, a pivotally mounted L-shaped angular lever 11 is provided which cooperates at one end with the release plunger 2 and at its other end with an electronic timing device having a magnetic armature 12 and linked to an arm 11a of the lever 11 aligned for engagement by a holding magnet 13. In turn the holding magnet 13 is connected in series with a transistor T1 of an electronic switching device which is designed as a monostable trip circuit. In another circuit of this switching device, there is provided a capacitor C which is connected to a second transistor T2 and a variable resistor R. The variable resistor R and the capacitor C form a retarding device for the determination of the preset exposure time which is pre-selectable by a setting disc 14, mounted on the housing 1 and illustrated to its side in the drawings for clarity. By means of the setting disc 14, the ohmic value of the variable resistor R can be adjusted in accordance with the desired exposure time. A battery 15, connectable to the trip circuit through a main switch S1 which closes when depressing the release plunger 2, serves to supply current to the electronic timing device. This arrangement is specifically provided by a contact blade 16 of the main switch S1, which is held in the contact breaking position, as illustrated in FIGURE 1, by an actuating cam 2c when the plunger 2 is in the starting position.

As already indicated, the ball detent can be unlocked by means of the angular lever 11 which has a protrusion 11b provided on its arm portion 11a, which in the starting position of the release device is biased against the face of the unlocking sleeve 9 by the force of a return spring 17, thus keeping the balls 7 out of the conical inner surface 3a of the bushing.

As is apparent from the drawings, the angular lever 11 is pivotable by means of the actuating cam 2c acting against the bias of the return spring 17. For this purpose, a by pass pawl 18 is biased by a spring 19 against a tab 11d bent away from the angular lever 11, and is pivotally mounted on the arm portion 11c of the angular lever 11 so to be in position for engagement by the actuating cam 2c upon movement of the plunger 2.

Besides the main switch S1, the electronic switching device has a contact switch S2, which is assigned to the RC member, with a contact blade 20, which in the initial position of the device, is adapted to be biased into at the contact making position, as illustrated in FIGURE 1, thereby shortcircuiting the capacitor C. However, when the contact switch S2 opens, as illustrated in FIGURE 2, the capacitor C begins to charge in accordance with the exposure time preselected by means of the setting disc 14.

In order for the breaking process of the contact switch S2 to always take place at the correct moment, without first having to adjust the release device to the specific release stroke of the camera, the contact switch S2 can be actuated by a relay 21 which is connected to the battery 15 in parallel with the electronic switching device. Moreover, the arrangement is such that the flash contact of the shutter to be released by the device is included in the circuit of relay 21. For this purpose, a connecting cable 22, attached to the housing 1 of the release device, is electrically connected to both the relay 21 and the battery 15, so that it can be plugged into the flash contact connector socket disposed on the shutter housing 5 or the camera by means of the cable plug 23. The relay 21 has a pivotally mounted armature 24 which is biased into contact with a fix pin 25 under the pressure of a contact spring 20 of the switch S2.

Means are further provided on the release device for releasing the plunger 2, when it has been inadvertently depressed, in order to return it to the starting position. To accomplish this, the armature 24 of the relay 21, in the embodiment illustrated in FIGURES 1 and 2, is provided with an arm 24a cooperating with a pivotally mounted dual-armed support lever 26 through a pin-slot arrangement. In the initial position of the release device, and also whenever the plunger 2 is not fully depressed to release the camera shutter, the free end 26a of the lever 26 is positioned against the face of the unlocking sleeve 9 exerting thereon the same effect as the angular lever 11.

The handling and operation of the above described arrangement illustrated in FIGURES 1 and 2 are as follows:

In order to take pictures with an ultra-long exposure time, the release device is attached to the connector 5a of the shutter housing 5 by means of the flexible cable release adaptor 4, and the connecting cable 22 is plugged into the flash contact connection socket. When the release plunger 2 is depressed, the actuating cam 2c moves away from engagement with the contact blade 16 of the main switch S1 allowing it to close. As a consequence, the transistor T1 is energized and the holding magnet 13 receives current. Substantially at the same moment, the actuating cam 2c engages the pawl 18 causing the angular lever 11 to pivot and to release the unlocking sleeve 9 whereby the lever 11 moves into the position illustrated in FIGURE 2 where it is engaged by the electro magnet 13 and held in this position as long as the latter carries current.

By depressing the release plunger 2 still further, the shutter is released causing the sectors 5b to move into the open position. As a result, the flash contact built into the shutter housing 5 closes in conventional manner so that the relay 21 now receives current and is enabled to attract the armature 24 which engages the contact spring 20 and moves the contact switch S2 to the open position, thus causing capacitor C to start charging. At the same time, the support lever 26 is turned clockwise and moved into the position illustrated in FIGURE 2 so that the unlocking sleeve 9 is free to move upwardly. The plunger 2, after it has been released, is held in the release position by the ball detent, thereby causing the shutter sectors 5b to remain in the open position.

The charging period of the capacitor C which starts to charge when the contact switch 2 opens depends, among other factors, on the magnitude of the ohmic value of the resistor R which corresponds to the exposure time pre-selectable by means of the setting disc 14. After the preset time has elapsed, the capacitor C will have reached the base potential of the transistor T2 so that it is energized while the transistor T1 suddenly blocks. Consequently, the holding magnet 13 becomes currentless and releases the armature 12, enabling the angular lever 11 to return to its initial position, illustrated in FIGURE 1 under the force of the return spring 17, whereby the ball detent is unlocked due to the fact that the tab 11b strikes against the unlocking sleeve 9. This, in turn, makes it possible for the release plunger 2 to return into its initial position under the force of the return spring 6, enabling the shutter sectors 5b to move back into the closed position. The flash contact in shutter 5 thereby opens and the relay 21 becomes currentless so that the armature 24 can pivot, under the effect of the contact spring 20, into contact with the pin 25 thereby reestablishing the starting position illustrated in FIGURE 1.

If the release plunger 2 is not completely depressed by the photographer until the shutter is released, the plunger 2, after it has been let go, can return into its initial position even though the main switch S1 is switched on and the angular lever 11 is held in the release position, as illustrated in FIGURE 2, by the holding magnet 13. This occurs because relay 21 remains currentless, and the support lever 26 remains in the basic position illustrated in FIGURE 1. Therefore, after the release plunger 2 has been let go, it immediately returns to its initial position due to the biasing effect of the return spring 6, thereby opening the main switch S1.

In contrast to the arrangement described above, the return of the release plunger 2, when inadvertently actuated, is accomplished electrically in the embodiments illustrated on FIGURES 3 through 11. A dual switch S3, which can be actuated by a relay armature 30 and which takes over the functions of the two switches S1 and S2 of the embodiment illustrated in FIGURES 1 and 2, is operable by the relay 21 which is controllable by the flash contact. The dual switch S3 has a contact spring 31 biased against the armature 30, tending to force the switch S3 into the contact making position II for shortcircuiting the capacitor C. When the contact spring 31 has been illustrated in FIGURES 3 through 11. A dual switch S3, connects the electronic switching device with the battery 15. As the holding magnet 13 receives current only after the opening of the shutter due to the dual switch S3 being dependent on the relay 21, it is expedient to have the armature 12 make contact with the magnet 13 prior to actuating this switch, and to keep it in this position mechanically until the holding magnet 13 has built up a magnetic field. For this purpose, all the embodiments described below for carrying out the objects of this invention have a release plunger composed of two telescoping parts.

In the embodiment illustrated in FIGURES 3 and 4, both plunger parts 32 and 33 are joined to each other by a slide plate 34 which permits limited relative motion of these parts and, in addition, is movable transversely to the actuating direction of the plunger. This embodiment provides a pin 32a projecting from the upper plunger part 32 which is disposed in a transverse slot 34a in the slide plate 34, and pins 33b and 33c projecting from the lower plunger part 33, which are disposed in two parallel slots 34b and 34c respectively, that are oriented obliquely to the direction of motion of the plunger 32, 33. A compression spring 35, disposed within the hollow core of the plunger part 33 biases apart the plunger parts 32 and 33 as far as the slots 34a, 34b, and 34c permit, so that in the starting position illustrated in FIGURE 3, the slide plate 34 contacts a fixed stop 36. Cooperating with the slide plate 34 is an angular lever 37, one end of which carries the magnet armature 12 and which lever is adapted to act upon the unlocking sleeve 9 of the ball detent by means of a protrusion 37a. The opposite end of the lever 37 has a pin 37b biased against a guiding edge 34d of the slide plate 34 by the return spring 17.

When the release device illustrated in FIGURES 3 and 4 is used, the photographer must first connect the device with the flash contact connector socket and the flexible cable release adaptor for the shutter in the same manner as the embodiment illustrated in FIGURES 1 and 2. As the plunger is actuated, the upper plunger part 32 is first telescoped into the lower plunger part 33, against the biasing force of the relatively weak compression spring 35, until the full length of the telescoping portion of the upper part 32 is disposed firmly within the lower part 33. Due to the special shape of the slots 34a, 34b, and 34c in the slide plate 34, the latter, in addition to making a downward motion as viewed in FIGURE 3, also shifts to the left causing the angular lever 37 to rotate in a counterclockwise direction against the force of the return spring 17. Hence, the armature 12 is again positioned in contact with the holding magnet 13, thereby releasing the unlocking sleeve 9 so that the ball detent is operable. During further downward movement of the plunger, the upper and lower plunger parts 32 and 33 move simultaneously, so that the shutter finally is released. The flash contact, closing with the actuation of the shutter sectors into the open position, causes the relay 21 to be energized, whereby the contact spring 31 of the dual switch S3 is moved from the contact making position II into the contact making position I, illustrated in FIGURE 4, due to the magnetic actuation of the armature 30. This connects the electronic switching device and the holding magnet 13 controlled by it to the battery 15, and the short circuit of the capacitor C is interrupted so that it starts to charge.

When the upper plunger part 32 is released, it moves upwardly under the biasing force of the compression 35, so that the slide plate 34 moves to the right as viewed in FIGURE 4. However, the lower plunger part 33 continues to be held in a released position by a ball detent, so that the shutter remains open. After the set exposure time has elapsed, the holding magnet 13 is de-energized and the angular lever 37 is returned to its starting position by the force of the return spring 17, allowing the lower plunger 33 finally to return to its basic position as illustrated in FIGURE 3. As in the embodiment illustrated in FIGURES 1 and 2, the result is the closing of the shutter so that the contact spring 31 returns into the contact making position II illustrated in FIGURE 3, thereby disconnecting the electronic switching device from the battery 15.

If the release plunger 32, 33 is not depressed fully until the shutter is released, then the relay 21 is not energized and, consequently, the electronic switching device as well as the holding magnet 13 remain currentless. With the release of the upper part 32 of the plunger in this intermediate position, the slide plate 34 moves to the right as viewed in FIGURE 4, so that the angular lever 37 can act upon the unlocking sleeve 9, allowing the lower plunger part 33 to return to its starting position.

In the design of the electronically controlled released device illustrated in FIGURES 5 and 6, a release plunger also consisting of two coaxially disposed parts 40 and 41 is provided with return springs cooperating with each plunger part. The upper plunger part 40 is loaded by a compression spring 42 biased against a lug 1a fixed to the housing 1, and the lower plunger part 41 is biased towards the plunger part 40 by a return spring 6 acting in a manner similar to that described for the previously described embodiments. In order to pivot the angular lever 37, an actuating arm 43 is attached to the upper plunger part 40 and has a steering edge 43a engaged with the pin 37b on the angular lever 37.

In the starting position illustrated in FIGURE 5, both the plunger parts 40 and 41 are biased into contact with each other and forced upwardly against a pin 36. In this position, the angular lever 37 is engaged with the unlocking sleeve 9, thereby keeping the ball detent in the ineffective position. When the plunger 40, 41 is depressed and it traverses the length of the stroke S1, the angular lever 37 is turned in a counterclockwise direction by the steering edge 43a so that the armature 12 comes to rest against the holding magnet 13. The angular lever 37 is maintained in this position during further actuation of the release plunger 41, 42 because the pin 37b remains in contact with the steering edge 43b of the actuating arm 43.

As soon as the shutter is released, relay 21 responds, and the electronic trip circuit becomes operative in the manner described above. When the upper plunger part 40 has been released, it will return into its initial position, as determined by the pin 36, under the biasing effect of the return spring 42. However, the lower plunger part 41 is again held in a release position by the ball detent until released by the angular lever 37 after the set exposure time has elapsed. Upon return of the lower plunger part 41 into the starting position, the shutter closes and the armature 30 is released so that the electronic timing device of the release device is switched off.

If the actuation of the plunger 40, 41 is interrupted prematurely and the load is removed from the upper plunger part 40, so that it is moved into its starting position by the return spring 42, the armature 12 is released from the holding magnet 13 because the relay 21 is not energized, and the angular lever 37 releases the ball detent so that the lower plunger part 41 is free to move into its starting position.

In another embodiment illustrated in FIGURES 7 through 11, a bypass pawl 46 is pivotally mounted on one end of the upper lever arm of the angular lever 37 to effect pivotal movement of the latter. The pawl 46 has two tabs 46a and 46b extending therefrom to limit the relative rotary motion of the pawl 46 with respect to the angular lever 37. Because of the effect of the return spring 47, the pawl 46 is biased against the angular lever 37 with its tab 46a. The free end of the pawl 46 carries a jaw clutch 46c having conical sides 46d, as illustrated in FIGURE 8, which makes contact with the upper plunger part 48. The upper plunger part 48 is also telescoped into the lower plunger part 49 and biased apart by a compression spring 50 whose separating action is limited by a pin-slot connection 48a, 49a. Moreover, the lower plunger part 49 is provided with a stop collar 49b which, under the effect of the return spring 6 similar to the one illustrated in FIGURES 1 and 2, is biased against the stop pin 51 affixed to the housing 1.

The release device, illustrated in FIGURES 7 through 11, is connected to the camera or its shutter in the same manner as the previously described embodiments. When the upper plunger part 48 is depressed, the sides 46d of the jaw clutch 46c on the bypass pawl 46 engage the upper plunger part 48, so that the pawl 46 is rotated in a clockwise direction relative to the angular lever 37 until the tab 46b makes contact with the lever 37. The angular lever 37 is thereby automatically turned in a counterclockwise direction causing the armature 12 to make contact with the holding magnet 13. In this intermediate position, the pawl 46 and the angular lever 37 form a rigid lever system. Overcoming the friction between the sides 46d of the jaw clutch 46c and the cylindrical surface of the upper plunger 48, both of the plunger parts 48 and 49 when further depressed, move downwardly until the shutter is released. At that instant, relay 21 again responds, as illustrated in FIGURE 9, so that the electronic timing device can function in a manner similar to that described previously. The return motion of the upper plunger part 48, after it has been released, is effected by the compression spring 50, and is limited, as illustrated in FIGURE 10, by the pin slot connection 48a, 49a. The jaw clutch 46c thereby assumes the position relative to the upper plunger part 48 illustrated in FIGURE 11. After the elapse of the set exposure time, the armature 12 is released from the holding magnet 13, and the angular lever 37 releases a ball detent so that the plunger parts 48 and 49 can resume their initial position as fixed by the pin 51 wherein the sides 46d of the jaw clutch 46c are again in contact with the cylindrical surface of the upper plunger part 48.

In the embodiment illustrated in FIGURES 7 through 11, there is also assurance that the release plunger 48, 49 can return into its initial position when inadvertently actuated. If the upper plunger part 48 is released prematurely, its return motion causes the pawl 46 to move back into its initial position under the effect of the spring 47, whereby the angular lever 37 is enabled to return into its basic position which, in turn, results in the release of the ball detent.

Thus, this invention provides a release device in which the progression of the various functional steps which occur in the proper time sequence with the use of relatively few structural parts that are relatively easy to operate.

It will be understood that the foregoing description with the details of exemplary structure is not to be construed in any way to limit the invention, but that modifications may be made thereto without departing from the scope of the invention as set forth in the following claims.

Having thus described the invention, we claim:

1. A release device for a photographic camera for achieving relatively long exposure times of various duration in the "B" setting of the camera; a release plunger for actuating the camera's shutter; an adjustable electronic timing device; means operably connecting said release plunger and said electronic timing device for actuation of said release device; said electronic timing device including resistor-capacitor means having contact switch means to initiate the charging of the capacitor of said resistor-capacitor means, and relay means operably connected to said switch means and said resistor-capacitor means, and connecting means for attaching said relay means to the flash contact connector socket of the camera, said connecting means being operable to receive current by way of the flash contact when the shutter blades of the camera attain the open position.

2. The release device of claim 1 wherein said relay means is connected in parallel to a battery of said electronic timing device, and wherein said connecting means attaches the flash contact of the camera in series with said relay means and said battery.

3. The release device of claim 1 wherein said switch means cooperating with said resistor-capacitor means has a contact spring which, countering its own spring action, can be changed by an armature of said relay means from the contact making position into the contact breaking position, relative to the said capacitor, so that said capacitor starts charging.

4. The release device of claim 1 wherein said plunger is engageable by a detent for keeping said plunger in the release position, and wherein safety means are provided operably connected with said detent and with said relay means which is operable by the flash contact of the camera to prevent said detent from assuming the locked position prior to the release of the shutter.

5. The release device of claim 4 wherein said relay means is connected with a pivotally mounted dual-armed support lever which prevents said detent from assuming the locked position when said relay means is currentless.

6. The release device of claim 4 wherein main switch means are provided for said electronic timing device which cooperates directly with said relay means, so that said main switch means can be transferred into the contact making position by said relay means when the shutter of the camera is released; and wherein said release plunger comprises two coaxially disposed parts which cooperate with an angular lever that keeps said detent in the ineffective position, said lever being movable from its initial position upon actuation of said plunger for releasing the detent, and for contact with a holding magnet controlled by the electronic switching device.

7. The release device of claim 6 wherein said two plunger parts are held in a connected relationship by a slide plate which can move in a direction transverse to the actuating direction of said plunger, said slide plate having a guiding edge against which said angular lever makes contact under the effect of a return spring.

8. The release device of claim 6 wherein the upper part of said plunger has an actuating arm with a steering edge for pivoting said angular lever.

9. The release device of claim 6 wherein said angular lever has an arm cooperating with the upper plunger part, said arm having a pivotally mounted pawl thereon with a jaw which can be brought into frictional contact with said upper plunger part.

10. The release device of claim 9 wherein said pawl has two stops which limit the relative rotatary motion of the said pawl with respect to said angular lever, said stops being so disposed that said pawl is fixed by one of said stops in its initial position, so that said jaw frictionally engages the outer surface of said upper plunger part, the other of said stops being disposed to limit the relative pivotal motion of said pawl with respect to said lever when actuating said plunger.

11. The release device of claim 10 wherein said plunger parts are connected to each other by pin-slot means and are loaded by a compression spring acting upon both of said parts, and wherein said lower plunger part has a stop collar which in the initial position of the plunger contacts a stationary pin under the effect of a return spring.

12. A release device for a photographic camera for achieving relatively long exposure times of various duration in the "B" setting of the camera comprising: a housing; a release plunger movably mounted on said housing; mechanical connecting means mounted on said housing and operably connectable to the camera for operating the shutter thereof, said mechanical connecting means being movable by said plunger; an adjustable electronic timing device mounted on said housing; actuating means operably connecting said release plunger and said electronic timing device for actuation of said release device; said electronic timing device including resistor-capacitor means having contact switch means to initiate the charging of the capacitor of said resistor-capacitor means, and magnetic means operably connected to said switch means and said resistor-capacitor means, and electrical connecting means for attaching said magnetic means to the flash contact connector socket of the camera, said connecting means being operable to receive current by way of the flash contact when the shutter blades of the camera attain the open position.

13. The release device of claim 12 wherein said actuating means includes a movable armature engageable by second magnetic means of said electronic timing device for allowing said actuating means to hold said plunger in the release position, and wherein said armature is movable away from said magnetic means upon release therefrom to operate said actuating means for freeing said plunger from the release position.

References Cited

UNITED STATES PATENTS

| | | | |
|---|---|---|---|
| 3,276,342 | 10/1966 | Rentschler | 95—53 |
| 3,296,950 | 1/1967 | Starp | 95—53 |
| 3,357,332 | 12/1967 | Helber | 95—53 |

NORTON ANSHER, *Primary Examiner.*

LEO H. McCORMICK, JR., *Assistant Examiner.*